Oct. 31, 1944.    G. K. TEAL    2,361,719
ELECTRON DISCHARGE DEVICES AND ELEMENTS THEREOF
Original Filed July 31, 1941    2 Sheets-Sheet 1
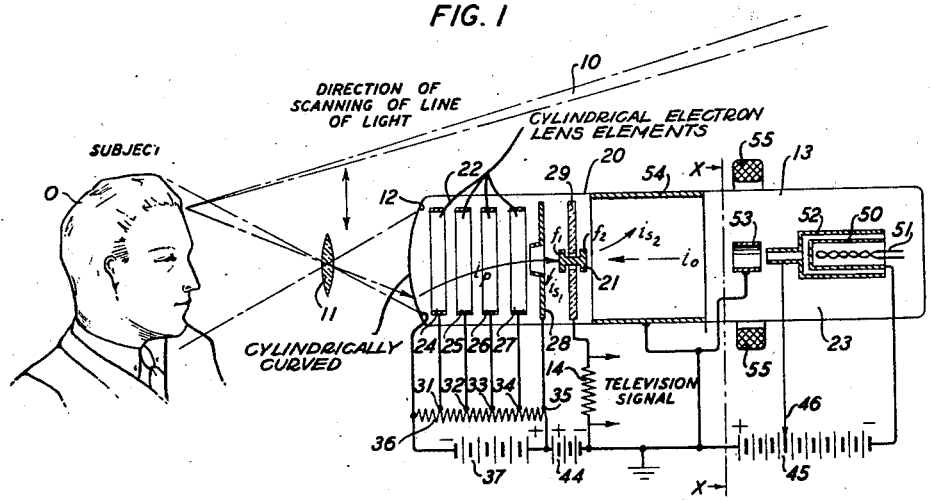
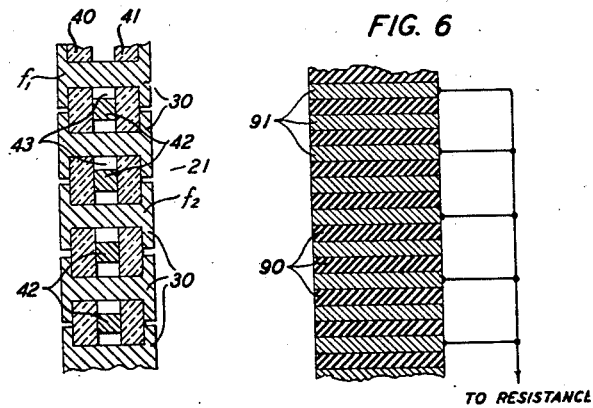
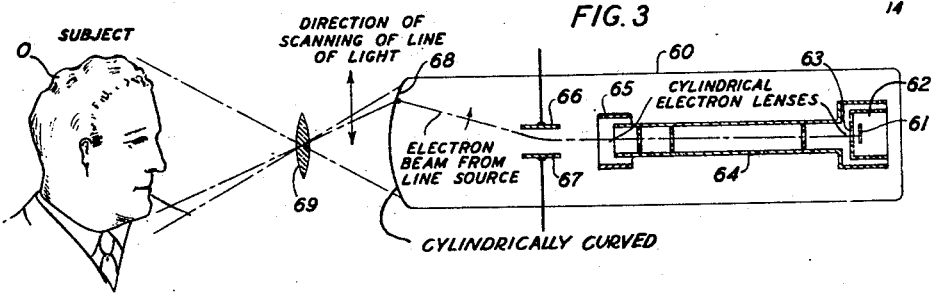
INVENTOR
G. K. TEAL
BY
ATTORNEY Oct. 31, 1944.   G. K. TEAL   2,361,719
ELECTRON DISCHARGE DEVICES AND ELEMENTS THEREOF
Original Filed July 31, 1941   2 Sheets-Sheet 2
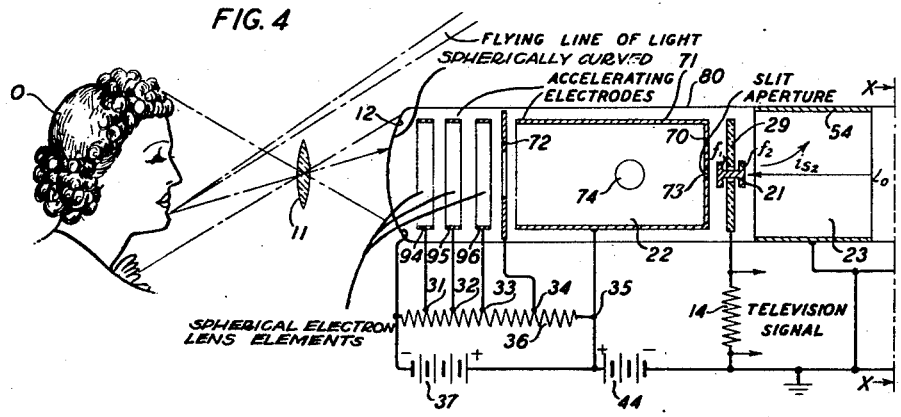
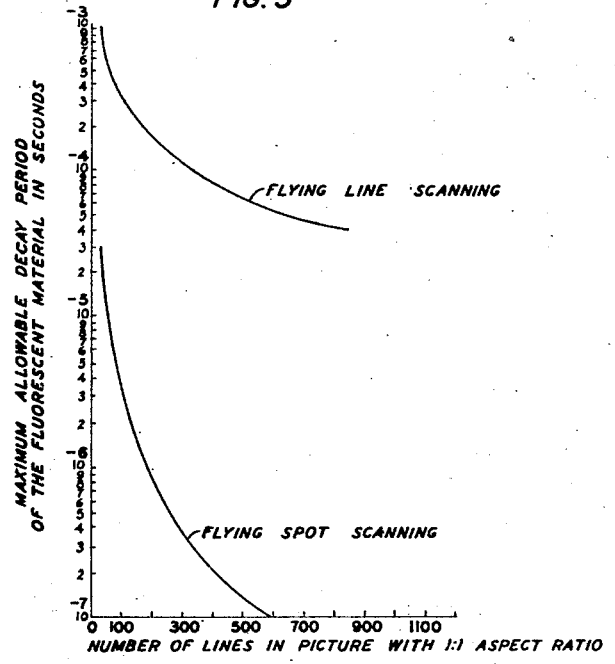
INVENTOR
G. K. TEAL
BY
ATTORNEY Patented Oct. 31, 1944

2,361,719

UNITED STATES PATENT OFFICE 2,361,719

ELECTRON DISCHARGE DEVICE AND ELEMENTS THEREOF

Gordon K. Teal, Summit, N. J., assignor to Bell Telephone Laboratories, Incorporated, New York, N. Y., a corporation of New York Original application July 31, 1941, Serial No. 404,767. Divided and this application August 1, 1942, Serial No. 453,214

10 Claims. (Cl. 250—153)

This application relates to electron discharge devices and elements thereof and more specifically to the structure of tubes of the electron storage type.

It is an object of this invention to provide novel electron discharge devices of the type wherein electric charges are stored.

It is another object of this invention to provide a novel mosaic target for electrons.

It is a further object of this invention to provide novel electron camera tubes of the type which includes a linear mosaic target.

Several difficulties have impeded the immediate development of a satisfactory electronic two-way television system. For example, it is very desirable to use either a camera tube because of its large storage of charge or a combination of flying spot scanning of the subject by fluorescent light from a projection cathode ray tube with a multiplier photocell. The camera tubes now in use, however, require too great an intensity of light on the subject and current methods of using such flying spot scanning place very severe requirements on the rapidity of the decay of the fluorescence of screen material.

In the present invention these difficulties are greatly ameliorated without elimination of the use of a storage type of camera tube. By recourse to a flying line of light from a cathode ray tube of this invention in combination with a camera tube having in it a one-dimensional mosaic, it becomes practical to construct tubes which give a storage of charge which as pointed out hereinafter is greater than that occurring in present camera tubes in an equal interval of time due to the reduction of spurious signals caused by the secondary emission from the mosaic. The use of the line light source in combination with such a camera tube also reduces the stringency of requirement on the rapidity of decay of the fluorescence of the screen material.

In one embodiment of the invention, shown by way of example for purposes of illustration, a television transmission system is provided employing an electron camera tube having a one-dimensional mosaic of conducting plugs supported in capacitative relationship to a common condenser plate. The subject is scanned in a vertical direction at frame frequency by a moving line of light. An image of the subject is focussed by a lens system onto a semitransparent cylindrically curved photocathode the curvature of which is such as to direct, in cooperation with cylindrical electron lens elements, all electrons from a vertical arc in a plane parallel to the drawing onto a single corresponding element of the one-dimensional photosensitive mosaic. The image of the line of light on the subject thus moves vertically on the photocathode resulting in the storage of positive charges during a line period due to the photoemission from the elements of the photocathode to a collecting electrode positioned closely adjacent thereto. The individual elements of the mosaic are scanned at line frequency by an electron beam from a cathode ray gun at a voltage such that they are thereby driven to a less positive equilibrium potential. The television signal is taken off the condenser plate by means of a coupling resistance. A special type of cathode ray gun for generating a moving line of fluorescent light is provided and this gun comprises a line source of electrons and cylindrical electron lenses for focussing the electrons onto a line of the fluorescent screen. The linear sheet of electrons is deflected at frame frequency by means of a sawtooth wave applied to a pair of deflector plates.

In a modified arrangement, an electronic "image" of a spherically curved photocathode is formed on a diaphragm at the end of the final accelerating electrode and a slit in this diaphragm parallel to the flying line of light intercepts portions of the electronic image swept vertically across the slit in synchronism with the movement of the line of light. While only a line of the photocathode is illuminated at a time, the sheet of electrons corresponding thereto is made to coincide with the slit by means of the vertical movement which is caused, for example, by magnetic coils.

The invention will be more readily understood by referring to the following description taken in connection with the accompanying drawings forming a part thereof in which:

Fig. 1 shows a television transmitter in accordance with the invention;

Fig. 2 is an enlarged view of a portion of the electron target in the tube shown in the system of Fig. 1;

Fig. 3 shows apparatus for generating a moving line of light;

Fig. 4 is a modification of the system shown in Fig. 1;

Fig. 5 is a graphical representation to aid in explaining the principles of this invention; and Fig. 6 is an enlarged view of another form of electron target.

Referring more specifically to the drawings, Fig. 1 shows, by way of example for purposes of illustration, a television system embodying certain principles of this invention. The system comprises means (shown in greater detail in Fig. 3) for producing a moving line of light 10 preferably for vertically scanning an object or field of view O, a lens system represented generally by the single lens 11 for collecting light reflected from the object or field of view O and for projecting an image thereof upon a curved photocathode 12 located at one end of a cathode ray tube 13 wherein a television image current is formed and passed through resistance 14 in the external circuit thereof. The photocathode 12 is curved cylindrically. The resistance 14 is preferably connected to amplifying means and other appropriate apparatus (not shown) for transmitting a television signal to a receiving station.

The cathode ray transmitter tube 13 comprises an evacuated envelope 20 of approximately rectangular cross section in a plane perpendicular to the plane of the drawings, the longer dimension of the cross section being in the direction perpendicular to the plane of the drawings, which envelope is separated by a linear mosaic electrode 21 and a diaphragm member 29 into a first chamber 22 and a second chamber 23. The barrier between the two chambers 22 and 23 need not be gas-tight, however. In the first chamber 22 a photosensitive layer 12 is coated on the curved end of the tube and a plurality of accelerating electrodes 24, 25, 26, 27 and 28 which constitute cylindrical lens elements (i. e., pairs of plates, each being longer than the mosaic electrode and each of the plates of a pair being at the same potential, or rectangular open-ended boxes, the dimension of each of which in the direction at right angles to the plane of the drawings is relatively long compared to the dimension in the plane of the drawings and to the length of the mosaic) focus the electrons emitted from the photocathode 12 upon the linear mosaic target 21 through the aperture in the last accelerating member 28 which is preferably a diaphragm member with a slit aperture therein. The linear mosaic element 21 is preferably contained in a diaphragm member 29 which is in capacitative relation to each of the plugs 30 in the mosaic electrode 21. (See Fig. 2.) Due to the curvature of the photocathode 12 and the focussing action of the electrode elements 24 to 28, inclusive, which are placed at progressively accelerating potentials by connections to successive taps 31, 32, 33, 34 and 35 of the potentiometer resistance 36 connected across the source of potential 37 (the photocathode being connected to the negative pole of said source), each of the electrons from the photocathode 12 regardless of its vertical position, is directed along a vertical arc (that is, in an arc in a plane parallel to the drawings) to the one-dimensional mosaic 21. In cases where the vertical focussing is not very sharp the elements of the mosaic can be made to have appreciable lengths in the vertical direction, which, however, is not objectionable. The image of the line of light on the subject O moves vertically on the photocathode 12, resulting in the storage of charge on the mosaic element 21 during a line period.

Reference will now be made to Fig. 2 which shows, by way of example, an enlarged cross-sectional view of one form of linear mosaic electrode 21 which may be used in the system of Fig. 1. The mosaic target 21 shown in this figure comprises two parallel and separated strips 40 and 41 of insulating material, such as mica, having apertures therein for the passage of two-sided conducting plugs 30. Between the insulating strips 40 and 41 is a metallic layer 42 having apertures 43 therein corresponding with the apertures in the plates 40 and 41 but being larger so as not to make contact with the conducting plugs 30. As pointed out above, the mosaic target 21 is mounted within a slit aperture in the plate 29 which acts as a common condenser plate to all of the conducting members 40, the plate 29 being connected through the output resistor 14 to the negative pole of the source of potential 44, the positive pole of which is connected to the positive pole of the source 37. The negative pole of the source 44 is preferably connected to ground and to the positive pole of a source 45, the purpose of which will be described more fully below.

The mosaic target 21 may be made, alternatively, by covering a mesh metallic screen with melted glass or other refractory material and then filling the holes with metal, or mosaics with narrower elements can be made by stacking pieces of mica 90 and metal 91 alternately as shown in Fig. 6. This method is much simpler than the other methods. The structure shown in Fig. 6 may use the diaphragm 29 as the common capacity element for the metal pieces 91 or alternate pieces 91 may be connected together and to the resistance 14 and form the capacity element in this manner. In this latter arrangement the elemental charges are set up between adjacent metallic strips. Referring again to Fig. 2 the sides $f_1$, of the plugs 30, facing the subject O are coated with suitable secondary emitting material, such as Cs—O—Ag, so that a positive charge is left on the plugs 30, the electrode element 28 acting to collect the secondary electrons emitted from the sides $f_1$ of the conducting members 30 when photoelectrons, which have been accelerated by the members 24 to 28, inclusive, strike these plugs.

In the chamber 23, means, such as the cathode 50, heated by a heater or filament member 51, and anodes 52, 53 and 54 are provided for generating a beam of primary electrons $i_0$ and for focussing it upon the ends $f_2$ of the conducting plugs 30 of the mosaic target 21. The electrodes 53 and 54 are preferably connected together and to ground. Ground is also made the potential of the positive pole of the source 45, an intermediate tap 46 of which is connected to the anode 52 and the negative pole of which is connected to the cathode 50. Any suitable means may be used to supply current to the heater 51. Means, such as the magnetic coils 55, 55 supplied with current of saw-tooth wave form cause the beam to sweep in a line perpendicular to the plane of the drawing across the faces $f_2$ of the conducting elements 30 to discharge the charges which have been formed between the conducting members 30 and the common electrode member 29 by the photoelectrons $i_p$ from the photosensitive target 12 impinging thereon. Secondary electrons ($i_{s_2}$) emitted from the surfaces $f_2$ are collected by the collector electrode 54 which preferably comprises a ring coating around the inside of a portion of the walls of the chamber 23.

While any suitable means for producing a line of light perpendicular to the plane of the drawing and which moves in the direction indicated by the arrow in Fig. 1 may be used, such as a mechanical optical device, preferably the moving line of light is generated by a line of electrons scanning a fluorescent material. Such a means is shown in Fig. 3 wherein there is provided a cathode ray tube 60 for generating a moving line of light 10 perpendicular to the plane of the paper and which scans the object or field of view O in the direction of the arrow. The tube 60 preferably comprises a linear cathode 61, a shielding member 62 surrounding the cathode except for a slit aperture 63 in the face thereof adjacent the cathode 61, cylindrical electron lens elements 64 and 65, a pair of deflecting plates 66, 67 and a fluorescent screen 68 on the end wall of the tube 60. A lens 69 focusses an image of the line of light on the fluorescent screen 68 upon the object or field of view O and this line of light, perpendicular to the plane of the drawing, moves up and down the object in the directions indicated by the arrow. The cylindrical lens elements 64 and 65 may comprise pairs of plates having the same potential applied to the plates of each pair but with the potential of the first pair being of a suitable ratio with respect to that of the second pair to form the stream of electrons into a line on the fluorescent screen 68. As an alternative the lens elements 64 and 65 may comprise tubes or boxes having rectangular cross-sections. Any suitable sweep circuit may be connected to the pair of plates 66, 67 to produce deflection of the line of light in a preferably vertical direction.

The system shown in Fig. 1 operates as follows: A line of light is generated by any suitable means, such as by the cathode ray tube 60 shown in Fig. 3 and this line causes the subject or field of view O to be scanned vertically at frame frequency, this frequency being determined by the frequency of the sawtoothed wave applied between the deflecting plates 66 and 67 of the tube 60. An optical image of the portion being scanned at each instant is focussed upon the curved photocathode 12 by means of the lens system 11. A sheet of electrons is generated at the photocathode 12 and because of its curvature which tends to direct the photoelectrons towards the line of elements 30 and because of the electrode elements 24 to 28, inclusive, no matter what the vertical height, this sheet $i_p$ hits on the line of conducting elements 30 so as to give a storage of charge during the line period. The sheet $i_p$, in effect, has one end on the line of element 30 and the other end moving in a direction generally transverse to the direction of movement of the electrons. Due to the front faces $f_2$ of the elements 30 being coated with a secondary-emitting material such as Cs—O—Ag, the rate of storage of charge is increased approximately ten times by secondary emission, the secondary current $i_{s_1}$ being collected by the collecting electrode 23. After an element has been charged very positive relative to the electrode 29 forming a common electrode of a capacity between it and all of the photoemissive elements 30 (and also with respect to the potential of the collecting electrode 54 for the secondary current $i_{s_2}$ from the faces $f_2$ of the conducting electrodes 30), it is discharged by the electron beam $i_0$ formed in the chamber 23. This beam is swept along the line in a direction perpendicular to the plane of the drawing by means of currents of saw-tooth wave form applied through the coils 55. This beam sweeps the line at line scanning frequency and drives the elements 30 to a less positive equilibrium potential relative to the potential of the last anode 54 in chamber 23. The television signal is generated across the resistance 14 connected between the electrode member 29 and ground (which is the potential of the last anode 54 of the electron gun system in a chamber 23).

The advantages of the arrangement shown in Fig. 1 over various arrangements of the prior art, may be listed as follows: (1) It is a storage method, thus being an improvement over the "spot scanning system" using mechanical means shown in Patent 2,113,254, issued April 5, 1938, to Frank Gray; (2) the average illumination of the subject can be kept low due to the flying line of light scanning feature; (3) it is a completely electronic system when the arrangement shown in Fig. 3 for generating the flying line of light is used; (4) the system avoids unfavorable optical systems inasmuch as it is not necessary to use cylindrical optical lenses; (5) the photoelectron current is saturated because the photocathode 12 is continuously negative with respect to the accelerating members 24 to 28, inclusive; (6) because of secondary emission, multiplication of the charge is obtained; (7) because of the fact that only a single line of elements is used, it is feasible to construct the mosaic by simple mechanical methods such as by stacking alternate layers of metal and mica; and (8) the trouble from spurious signals is minimized because the stacked layer line mosaic can readily be made to retard the return to the mosaic of secondaries released by the scanning beam by connecting every other metal plate 91 to the resistance 14 thus making these plates negative with respect to the alternate plates which are charged positively by the accelerated photoelectrons, and because the secondary current from a given element during discharge increases from a small value to $i_{s2}=i_0$ rather than decreasing from a high value to a value where $i_{s2}=i_0$, thus reducing the secondary electron spray for some signal strengths.

A comparison of the maximum allowable decay period of the fluorescent material used in the system of this invention with that in previous methods of flying spot scanning is given in graphical form in Fig. 5 wherein the maximum allowable decay period of the fluorescent material in seconds is plotted against the number of lines in the picture with a 1 to 1 aspect ratio, the upper curve being for flying line scanning and the lower curve being for flying spot scanning with photocell pickup. From these curves it appears that there is a much greater choice of fluorescent materials in using the flying line scanning method rather than the other and the chance of selecting a material with suitable brilliant radiations in regions of the spectrum to which the subject's eyes are relatively insensitive, i. e., the red and blue portions of the spectrum, is greatly enhanced. The choice of fluorescent materials can also be made much easier when a flying line of light is used with an image dissector type of camera tube in which an electron image of the line is swept across the defining square aperture by horizontal and frame sweeps in exact synchronism with the flying line of fluorescent light focussed on the subject.

Fig. 4 shows a modified arrangement. In this figure the tube 80 has a circular cross section and the accelerating electrodes shown in the chamber 22 are shaped and spaced in such a way as to focus an electronic image of the photocathode 12 which in this case is spherically curved on the end 70 of a final accelerating electrode 71, the electrodes 94, 95 and 96 being cylindrical members which act as spherical electron lens elements. These three electrodes are followed by a diaphragm electrode 72 and the long tubular accelerating anode 71. The rest of the elements in the tube 80, i. e., the electron gun elements in the chamber 23, are similar to the correspondingly numbered elements of the arangement shown in Fig. 1. The tube has been shown cut at the line X—X of Fig. 4 but it is to be understood that all portions to the right of this line are similar to those elements shown to the right of the line X—X in the arrangement of Fig. 1, it being understood, however, that the shapes of the envelopes may be different in the two cases. In the arrangement of Fig. 4, the slit 73 in the diaphragm 70 of the electrode element 71 is parallel to the flying line of light and hence the electron stream generated thereby and focussed upon the diaphragm 70. The entire electronic "image" (actually only a line at a time) is swept vertically across the slit 73 in synchronism with the movement of the line of light by means of current waves applied to the coils 74 indicated schematically on the drawings. By this arrangement the slit is at each instant filled with a line of electrons representative of the line of the image being scanned by the line of light at that instant. Thus, an electron image representative of a line of the object is caused to strike the ends $f_1$ of the elements 30 of the mosaic target 21 every line scanning interval where it is scanned by the electron beam $i_0$, generated in the chamber 23 as described above in connection with the arrangement shown in Fig. 1. An advantage of this type of tube is that the slit 73 can be used to limit the top and bottom of the scanning line. In this case, as long as the decay in the fluorescent material of the projection scanner is less than a frame period, the time of decay is not serious except in raising the average illumination on the subject. The rest of the method of operation is similar to that described in connection with Fig. 1.

It is obvious that the tubes shown in Figs. 1, 3 and 4 may be used in a non-mechanical system with any other non-mechanical generator of flying spots or lines of light, such as the supersonic light valve. The tubes of this invention may be used advantageously in scanning motion picture films which, for any reason, must be moved intermittently as is done in most film projectors.

Various other modifications may be made in the embodiments above described without departing from the spirit of the invention, the scope of which is indicated by the appended claims.

This application is a division of application Serial No. 404,767, filed July 31, 1941, now Patent 2,337,578, issued December 28, 1943.

What is claimed is:

1. A two-sided linear mosaic target for electrons comprising alternate flat layers of conducting and insulating material, and means for electrically connecting together alternate ones of said conducting layers leaving the intermediate ones insulated.

2. A two-sided linear mosaic target for an electron beam moving along a single linear path, comprising alternate flat layers, the thickness being very small compared to the other two dimensions, of conducting and insulating material stacked so that the relatively large parallel surfaces of the inner layer are contiguous to corresponding surfaces of adjacent layers so that there may be presented to the electron beam a target which in one dimension is equal to the thickness of a layer times the number of layers, and a conductor for electrically connecting together alternate ones only of said conducting layers, each of said conducting layers intermediate two of said layers connected to said conductor being insulated from the others of said conducting layers.

3. An electron discharge device comprising an evacuated container containing a photoelectric cathode the surface of which is a longitudinal segment of a cylinder the longitudinal axis of which is transverse to an axis of the device, and a single row of conducting elements upon which electrons from said cathode impinge, the line through the centers of all of said conducting elements being transverse to the said axis of the device.

4. An electron discharge device comprising an evacuated container containing a photoelectric cathode the surface of which is a longitudinal segment of a cylinder the longitudinal axis of which is transverse to an axis of the device, a single row of conducting elements upon which electrons from said cathode impinge, the line through the centers of all of said conducting elements being transverse to the said axis of the device, and cylindrical electron lens elements between said cathode and said row of conducting elements.

5. An electron discharge device comprising an evacuated container containing a photoelectric cathode the surface of which is a longitudinal segment of a cylinder the longitudinal axis of which is transverse to an axis of the device, a single row of conducting elements upon which electrons from said cathode impinge, the line through the centers of all of said conducting elements being transverse to the said axis of the device, and means for scanning successively each conducting element with a beam of electrons.

6. An electron discharge device comprising an evacuated container containing a photoelectric cathode the surface of which is a longitudinal segment of a cylinder the longitudinal axis of which is transverse to an axis of the device, a single row of conducting elements upon which electrons from said cathode impinge, the line through the centers of all of said conducting elements being transverse to the said axis of the device, and means for scanning successively with a beam of electrons the end of each conducting element remote from said cathode 7. An electron discharge device comprising an evacuated container having a conducting member located intermediate the ends thereof which effectively separates the device into two chambers, a linear target located in an aperture in said conducting member, said target comprising a plurality of conducting elements each having an exposed face in each chamber, a photocathode at one end of the first of said chambers, means in said first chamber for accelerating photoelectrons from said cathode towards one face of the conducting elements in said linear target, means in said first chamber for collecting secondary electrons emitted from said conducting elements when struck by electrons from said photocathode, means in said second chamber for generating a beam of electrons, and means for deflecting said beam across the opposite face of said conducting elements.

8. An electron discharge device comprising an evacuated container having a conducting member located intermediate the ends thereof which effectively separates the device into two chambers, a linear target located in an aperture in said conducting member, said target comprising a plurality of conducting elements each having an exposed face in each chamber, a photocathode at one end of the first of said chambers, means in said first chamber for accelerating photoelectrons from said cathode towards one face of the conducting elements in said linear target, means in said first chamber for collecting secondary electrons emitted from said conducting elements when struck by electrons from said photocathode, means in said second chamber for generating a beam of electrons, means for deflecting said beam across the opposite faces of said conducting elements, and a connection from said conducting member through said container to an external circuit.

9. An electron discharge device comprising an evacuated container having a conducting member located intermediate the ends thereof which effectively separates the device into two chambers, a linear target located in an aperture in said conducting member, said target comprising a plurality of conducting elements each having an exposed face in each chamber, a photocathode at one end of the first of said chambers, said photocathode being spherically curved, means in said first chamber for accelerating photoelectrons from said cathode towards one face of the conducting elements in said linear target, means in said first chamber for collecting secondary electrons emitted from said conducting elements when struck by electrons from said photocathode, means in said second chamber for generating a beam of electrons, and means for deflecting said beam across the opposite face of said conducting elements, one of said accelerating electrodes comprising a long cylinder having an apertured diaphragm at the end thereof near said linear target, the aperture in said diaphragm being adjacent and parallel to said linear target.

10. In combination, a two-sided linear mosaic target for electrons comprising alternate flat layers of conducting and insulating material, means for electrically connecting together alternate ones of said conducting layers leaving the intermediate ones insulated, means for generating a sheet of electrons and for directing it upon said target, said means including a collector of secondary electrons emitted from said target when it is is impinged by said sheet of electrons, and means for placing said alternate ones of said conducting layers at a negative potential with respect to said collector.

GORDON K. TEAL.